United States Patent
Kuehn

(10) Patent No.: US 7,043,966 B2
(45) Date of Patent: May 16, 2006

(54) QUALITY CONTROL SYSTEMS FOR DETECTING LEAKS OF GASEOUS OR LIQUID MATERIALS FROM CLOSED CONTAINERS

(75) Inventor: Torsten Kuehn, Ingelheim (DE)

(73) Assignee: Boehringer Ingelheim Pharma GmbH & Co. KG, Ingelheim (DE)

( * ) Notice: Subject to any disclaimer, the term of this patent is extended or adjusted under 35 U.S.C. 154(b) by 0 days.

(21) Appl. No.: 10/755,530

(22) Filed: Jan. 12, 2004

(65) Prior Publication Data

US 2004/0139790 A1 Jul. 22, 2004

Related U.S. Application Data

(62) Division of application No. 10/152,182, filed on May 20, 2002, now Pat. No. 6,698,270.

(60) Provisional application No. 60/291,876, filed on May 18, 2001.

(51) Int. Cl.
*G01M 3/02* (2006.01)
*G01M 3/26* (2006.01)

(52) U.S. Cl. .................. 73/52; 73/40; 73/40.5 R; 73/49.2; 73/49.3; 73/49.8

(58) Field of Classification Search ............ 73/40, 73/49.2, 49.3, 49.5, 49.6, 49.7, 49.8, 52
See application file for complete search history.

(56) References Cited

U.S. PATENT DOCUMENTS

| | | | |
|---|---|---|---|
| 2,238,935 A | 4/1941 | Gumaer | |
| 2,422,921 A | 6/1947 | Nier et al. | |
| 2,608,855 A | 9/1952 | Jacobs | |
| 2,718,783 A | 9/1955 | Anastasia | |

(Continued)

FOREIGN PATENT DOCUMENTS

DE 94 01 662 2/1994

(Continued)

OTHER PUBLICATIONS

Hirobumi, Y., Patent Abstracts of Japan—Publication No. 56040712 Apr. 17, 1981- Standard Leakage Unit—Application No. 54115671, Application Date Nov. 9, 1979.

(Continued)

*Primary Examiner*—Hezron Williams
*Assistant Examiner*—David A. Rogers
(74) *Attorney, Agent, or Firm*—Michael P. Morris; Thomas C. Blankinship; Timothy X. Witkowski

(57) ABSTRACT

A system for testing systems which are in turn used to test the leaktightness of a hollow body is suggested.

Instead of the hollow body, a test body (2) is placed in the system which generates a defined pressure increase in a measuring chamber (4) within a pre-determined time span. This defined pressure increase corresponds exactly to the pressure increase generated by a hollow body with a small amount of leakage, wherein the hollow body can still just be regarded as leaktight.

The test body can be configured as a glass capillary which extends in a sealing manner between two chambers with different air pressure. Alternatively, the test body can comprise a material which can accept a defined amount of moisture from the ambient atmosphere during storage. A vacuum formed around the test body causes moisture to be withdrawn from the test body and at least partially evaporated in the vacuum, which again leads to an increase in pressure in the chamber. This pressure increase again corresponds to the just-tolerable pressure increase of a hollow body which is to be tested.

18 Claims, 3 Drawing Sheets

U.S. PATENT DOCUMENTS

| | | | |
|---|---|---|---|
| 2,980,513 A | | 4/1961 | Kapff |
| 3,129,729 A | | 4/1964 | Roberts |
| 3,186,214 A | * | 6/1965 | Roberts ................... 73/40.7 |
| 3,285,077 A | | 11/1966 | Rafferty |
| 5,152,411 A | * | 10/1992 | Pope et al. ................ 215/381 |
| 5,663,487 A | | 9/1997 | Widt |
| 6,082,184 A | * | 7/2000 | Lehmann ................... 73/49.3 |
| 6,305,215 B1 | * | 10/2001 | Lehmann ................... 73/49.3 |

FOREIGN PATENT DOCUMENTS

JP 09323774 A * 12/1997

OTHER PUBLICATIONS

Basford, James, A., Journal of Vacuum Science and Technology; Leak Calibration by the $\Delta P \Delta V$ and Pressure Difference Techniques, p. 3153-3158.

* cited by examiner

QUALITY CONTROL SYSTEMS FOR DETECTING LEAKS OF GASEOUS OR LIQUID MATERIALS FROM CLOSED CONTAINERS

This application is a division of U.S. Pat. application Ser. No. 10/152,182 filed 20 May 2002, and now U.S. Pat. No. 6,698,270, which in turn claims priority to U.S. Provisional Application 60/291,876, which was filed on May 18, 2001, and claims priority under 35 U.S.C. §119 therefrom.

BACKGROUND OF THE INVENTION

Plants and systems for testing whether a hollow body encasing gases or liquids (usually under pressure) is leaktight often operate according to the pressure maintaining principle. Here, the hollow body which is to be tested is surrounded with a vacuum. If the vacuum remains constant over the test period, the hollow body is considered leaktight. However, if the vacuum decreases and the pressure increases beyond a pre-determined fixed value, the hollow body is considered to be leaky.

Containers or cartridges for medical fluids or dosing aerosols for inhalers are named as examples of test subjects from the field of medicine. For example, reference is made to documents EP 0 775 076 B1, WO 00/49988, WO 97/39831, and WO 00/23037. All of the cartridges or containers described therein must be tested for their leaktightness. The methods used to this end include systems employing the hereinbefore-mentioned pressure-maintaining principle. The disclosures of such publications are herein incorporated by reference.

In order to guarantee the continuity of the test process, it is necessary to test the system itself via which the leaktightness of the hollow body is checked. An examination is carried out as to whether the measured pressure increase due to leakage is accurately measured and whether the correct conclusions are drawn from the measured values. It is therefore necessary to subject the leaktightness testing system itself to an examination from time to time.

In accordance with this, it is the object of the present invention to specify an examination system for such a leaktightness testing system.

THE INVENTION

In systems for testing hollow bodies, e.g., medical cannisters, to determine whether such cannisters or bodies are leaky, the cannister or hollow body (filled with gas or liquid) is placed in a vacuum. If the vacuum remains constant over a specified test period, then the cannister or hollow body is deemed leak-tight. However, if the vacuum decreases and the pressure increases beyond a pre-determined value, then the hollow body or cannister can be considered to be leaky. These systems must also undergo integrity checks. Accordingly, the present inventor has determined that the integrity of such systems can be ascertained by using, in place of the hollow body or cannister, a test body having certain characteristics. These characteristics allow reliable statements to be made as to whether the leaktightness testing system is functioning correctly.

This object is solved by the system according to the present invention, making reference to the drawings appended hereto.

Consequently, according to the first solution suggestion, a system for testing systems which in turn are used to check that a hollow body is leaktight is suggested wherein instead of the actual hollow body which is to be tested for leaktightness, a test body is placed in a test chamber which is separated into two chambers in such a way that one portion of the test body is exposed to the first chamber, which is at ambient pressure, and another portion of the test body is exposed to the second chamber which is at reduced air pressure. Here, the two chambers are separated from one another by means of a seal. The test body extends in a sealing manner through a penetration in the seal. Hence it is ensured that both chambers are separated from one another with regard to pressure. The test body has a defined leakage with a pre-specified leakage rate which corresponds to the amount of leakage which is still just acceptable in order for the hollow body to be defined as leaktight. As a result of the defined leakage, there is now a pressure increase in the second chamber which has lower air pressure. This pressure increase is measured over a certain period of time. If the measured leakage rate exceeds the pre-specified maximum leakage rate, it can be concluded that the entire system is not functioning correctly, since an additional leak must have appeared in the system or the measuring apparatus must not be functioning correctly. The operating personnel of the leaktightness testing system can then implement suitable measures to return the leaktightness testing system to its proper working condition.

A test body according to the invention for use in the hereinbefore-described system is configured so that the pre-specified leakage is realized by a glass capillary of given length and given diameter. This glass capillary therefore penetrates the hereinbefore—described seal between the two chambers of the test chamber which have different air pressures. Correspondingly, the glass capillary simulates a hollow body, for example a cartridge according to the above documents, with maximum tolerable leakage. Here, in a special application case the leakage rate of the glass capillary is $6.67 \times 10^{-3}$ mbar/sec $x_1$ for ambient atmosphere (ambient air).

This value corresponds to the maximum tolerable value for the cartridges or hollow bodies.

For reasons of practicality, the glass capillary is preferably supported by a sealed hollow body.

The given leakage of the glass fibres is preferably pre-specified by the diameter of the capillary, which, for this example, lies in the range of max. 50 μm.

According to the second embodiment of the present invention, a system is provided for the testing of systems which in turn are used to check that a hollow body is leaktight wherein instead of the hollow body, a test body is placed in a vacuum chamber, wherein a defined amount of moistness is supplied to the test body in advance and an increase in pressure is measured in the vacuum chamber within a pre-determined time span. If this measured pressure increase exceeds a given maximum pressure increase, it can be assumed that the leaktightness testing system is faulty.

The basis for this system is that the test body comprises a material which can absorb a defined amount of moistness from the ambient atmosphere during storage. The quantity of absorbable moistness can, among other things, be influenced by the size of the surface of the test body.

A vacuum is now generated around the test body in the vacuum chamber. During the test period, moisture is removed from the test body and is evaporated at least in part in the vacuum. This evaporation increases the pressure in the vacuum chamber. Dependent on the time span and the quantity of absorbed moisture, a defined pressure rise in the vacuum chamber is produced. This correlates with a just-tolerable pressure rise in the hollow body which is to be tested for leaktightness, the actual test subject of the leaktightness testing system.

Common to both systems is that the actual leaktightness testing system is calibrated in that the just-tolerable leakages are simulated, and in the actual test process. Exceeding those pre-determined parameters is a clear indication of additional leakages or other failures in the system function.

As already mentioned, in the case of the system according to the second embodiment, the test body comprises a special material. Materials to be used are those which have a relatively high absorbency capacity for moisture. The use of polyamide or polyoxymethyl is preferred.

A great advantage of all suggested test bodies is that these can be re-used after a recovery time. In the case of the system according to the first solution suggestion, pressure equilibration with the surroundings takes place during the recovery time after the test. In the case of the system according to the second solution suggestion, renewed absorption of moisture from the surroundings, with climate being constant, takes place after the test.

The invention is described with reference to two examples.

DETAILED DESCRIPTION OF THE DRAWINGS

Figure 1:
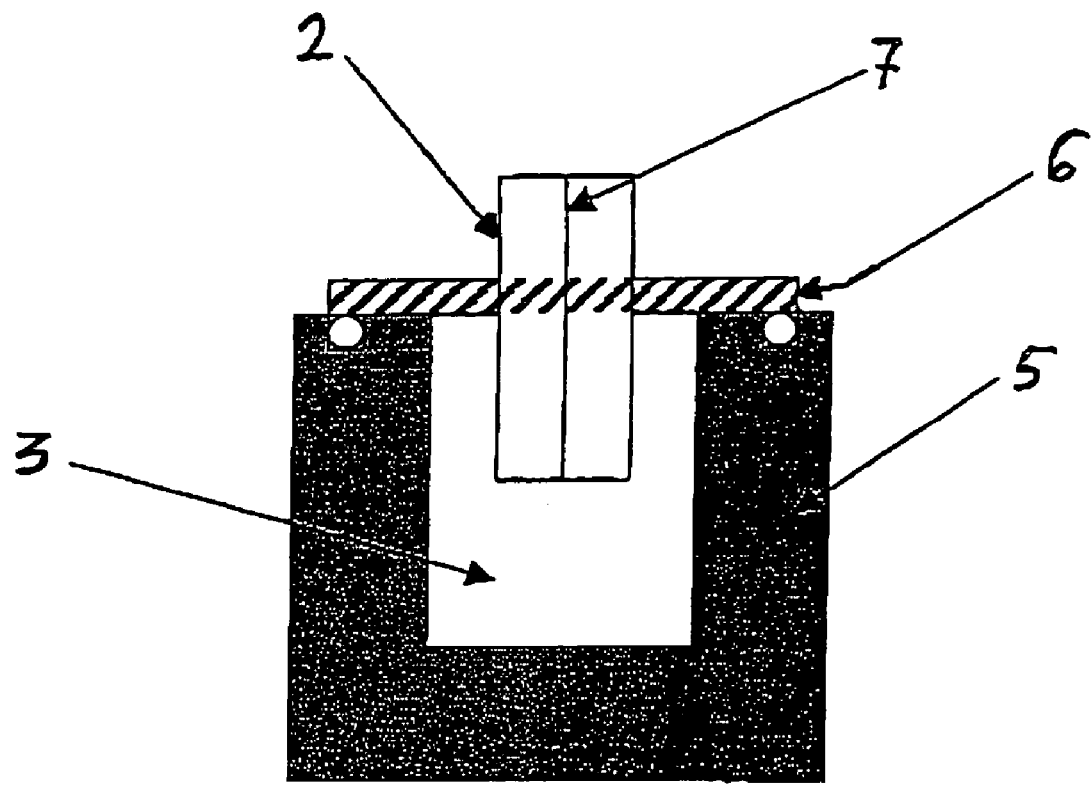
FIG. 1 schematically, the system according to the first embodiment.
Figure 2:
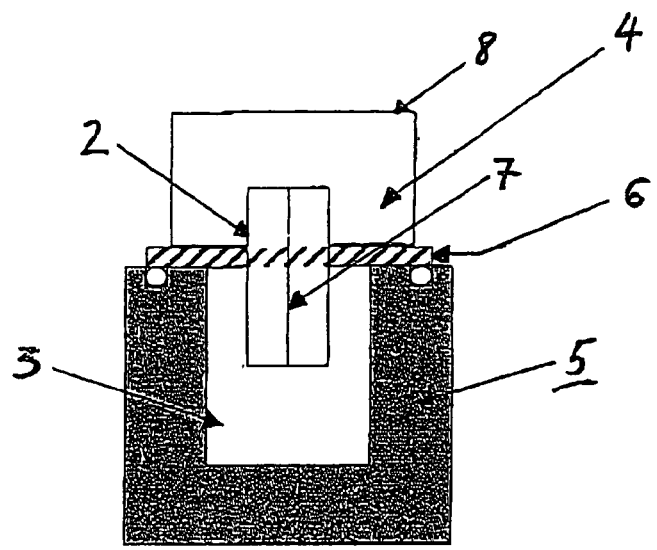
FIG. 2 the system according to the first embodiment, ready to use.

In the following text, the same reference numerals designate identical parts.

FIG. 1 schematically shows the first system. It substantially comprises the test chamber 5 in which the actual test subject, namely the hollow body, is placed after the leaktightness testing system has been recognized as ready to use. However, in order to test this system, the test body 2 is used. The test body 2 extends through a seal 6 via which the lower part of the test chamber 5 is sealed, separating off a first test chamber 3 which is generally at ambient pressure.

Figure 3:
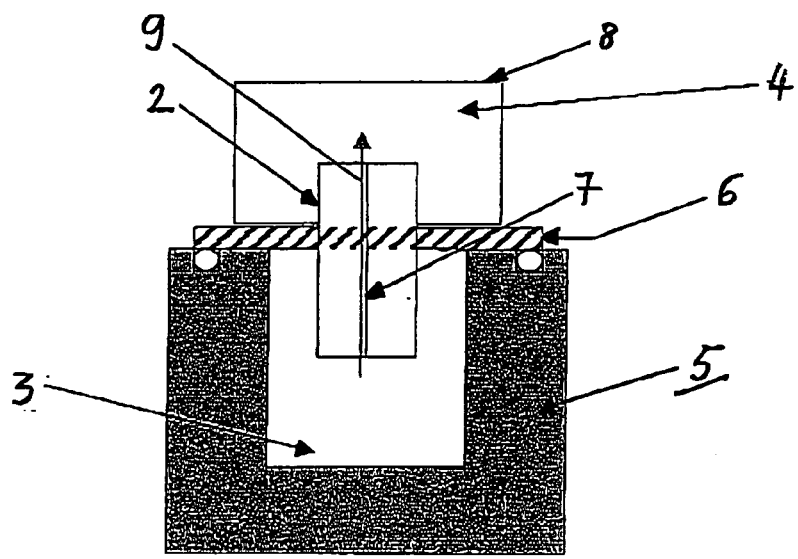
FIG. 3 the system of FIG. 2 during the test.

In the present case, the test body 2 comprises a hollow body and a defined leak which is realized by a glass capillary 7 of given length and given diameter. In order to implement the test, a suction vessel 8 is placed on the seal 6 and the thus-defined space is evacuated until the pressure therein is approximately 1 mbar. The suction vessel 8 encloses the second chamber 4 of the test chamber 5. If the air pressure in the first chamber 3 is approximately 1000 mbar and is approximately 1 mbar in the second chamber 4, the pressure difference between the two chambers is 999 mbar. Together with the glass capillary 7 of the test body 2, a certain pressure equilibration takes place between the chambers 3 and 4 within a given period of time. This is shown schematically in FIG. 3, where the air stream through the glass capillary 7 is indicated by the arrow 9.

The dimensions of the glass capillary 7 are selected so that the leakage rate corresponds to a leakage rate which indicates that the leakage is just acceptable in the case of the hollow body which is to be tested.

The leakage rate is determined by seniors (not illustrated). If the leakage rate exceeds a given value, it can be inferred that the system as such does not comply with the requirements for further use in the leaktightness testing process. Additional leakage is then the main cause of faulty function.

Figure 4:
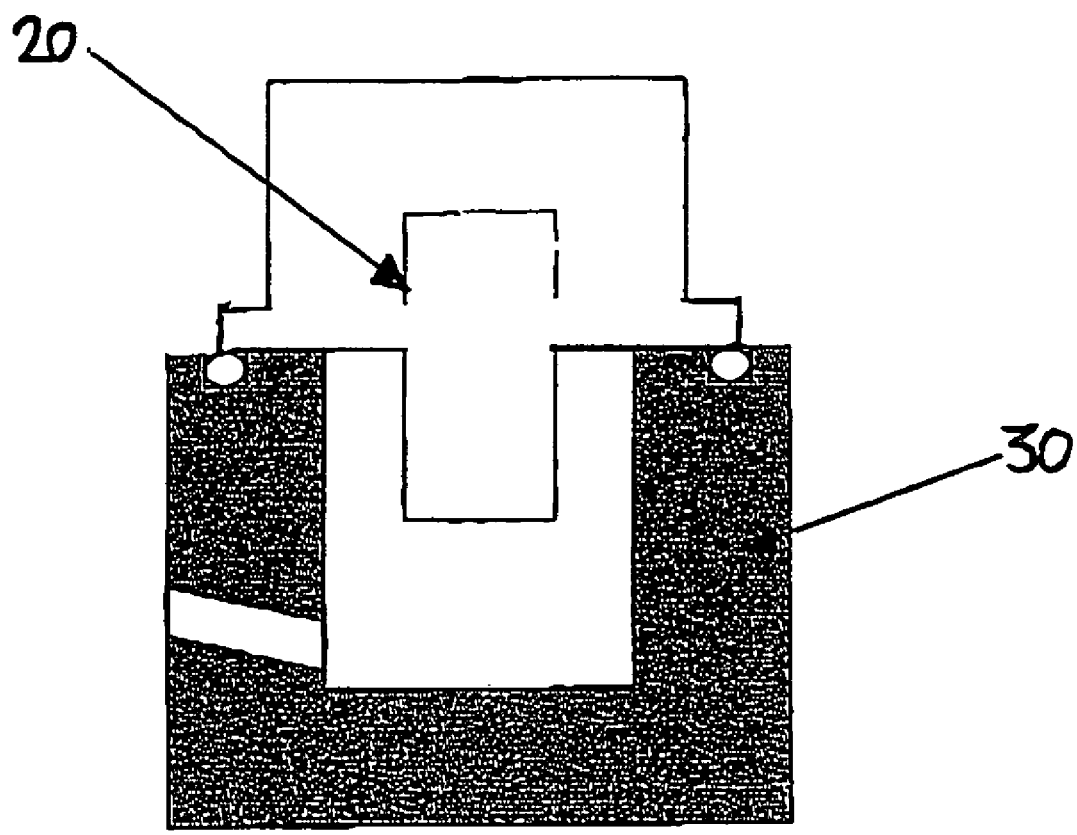
FIG. 4 the system according to the second embodiment.

FIG. 4 schematically shows the second suggested system. A test body 20 is placed in a vacuum chamber 20. A vacuum is generated around this test body in the vacuum chamber 30. Following this, moisture is withdrawn from the test body 20 during the test phase and is at least partially evaporated in the vacuum. This evaporation increases the pressure in the vacuum chamber 30, which can be measured by sensors (not illustrated). This rise in pressure corresponds to that which is just tolerable in the case of hollow bodies which are to be tested in the leaktightness testing system for their leaktightness.

What is claimed is:

1. An integrity testing system for leak-tightness testing systems, which are adapted in turn for determining or testing whether a canister or other sealed, hollow body filled with a liquid or gas under pressure is leaky, where such leaktightness testing systems employ a vacuum chamber and any change in pressure within the vacuum chamber is monitored, the integrity testing system comprising:

a test body (20) having a pre-determined amount of removably absorbed moistness and the vacuum chamber (30) of the leak-tightness testing system;

wherein at least a portion of the test body is exposed to the vacuum chamber;

whereby moisture is removed from the test body when a vacuum is generated in the vacuum chamber, the removed moisture producing a pressure increase in the vacuum chamber over a pre-determined time span.

2. The integrity testing system as recited in claim 1, wherein the test body comprises polyamide.

3. The integrity testing system as recited in claim 1, wherein the test body comprises polyoxymethylene (POM).

4. The integrity testing system as recited in claim 1, wherein the test body is adapted to absorb a defined amount of moistness from the ambient atmosphere before being placed in the vacuum chamber.

5. The integrity testing system as recited in claim 1, wherein the test body is a re-useable test body.

6. The integrity testing system of claim 1, wherein the pressure increase is a pre-determined pressure increase when the vacuum chamber is leak-tight.

7. The integrity testing system as recited in claim 6, wherein the pre-determined pressure increase simulates the amount of leakage that would be lust-tolerable from a leak-tight hollow body to be tested in the vacuum chamber.

8. The integrity testing system of claim 1, wherein the vacuum chamber is not leak-tight when the pressure increase exceeds a pre-determine pressure increase.

9. The integrity testing system as recited in claim 8, wherein the pre-determined pressure increase simulates the amount of leakage that would be just-tolerable from a leak-tight hollow body to be tested in the vacuum chamber.

10. A process for the integrity testing of leak-tightness testing systems, which leak-tightness testing systems in turn test whether a canister or other sealed, hallow body is leak-tight, the process comprising:

providing a test body, wherein a defined amount of moistness is removably supplied to the test body in advance;

placing the test body in a vacuum chamber of a leak-tightness testing system;

generating a vacuum around the test body in the vacuum chamber, whereby moisture is removed from the test body, and whereby a pressure increase is produced in the vacuum chamber by the moisture removed from the test body; and measuring the pressure increase in the vacuum chamber over a pre-determined time span to determine the integrity of the leak-tightness testing system.

11. The process of claim 10, wherein the test body absorbs the defined amount of moistness from the ambient atmosphere before being placed in the vacuum chamber.

12. The process of claim 10, wherein the test body can be re-used.

13. The process of claim 10, wherein the test body comprises polyamide.

14. The process of claim 10, wherein the test body comprises polyoxymethylene (POM).

15. The process of claim 10, wherein the pressure increase is a pre-determined pressure increase when the leak-tightness testing system is leak-tight.

16. The process of claim 15, wherein the pre-determined pressure increase simulates the amount of leakage that would be just-tolerable from a leak-tight hollow body to be tested in the leak-tightness testing system.

17. The process of claim 10, wherein the leak-tightness testing system is not leak-tight when the pressure increase exceeds a pre-determined pressure increase.

18. The process of claim 17, wherein the pre-determined pressure increase simulates the amount of leakage that would be just-tolerable from a leak-tight hollow body to be tested in the vacuum chamber.

* * * * *